United States Patent [19]
Paxton et al.

[11] Patent Number: 5,405,164
[45] Date of Patent: Apr. 11, 1995

[54] HYBRID INFLATOR RETENTION IN AUTOMOTIVE AIRBAG MODULE

[75] Inventors: Donald J. Paxton; David J. Green, both of Brigham City, Utah

[73] Assignee: Morton International, Inc., Chicago, Ill.

[21] Appl. No.: 207,016

[22] Filed: Mar. 4, 1994

[51] Int. Cl.⁶ .............................................. B60R 21/16
[52] U.S. Cl. .................... 280/728 A; 280/740
[58] Field of Search ............... 280/728 A, 740, 742, 280/728 R

[56] References Cited

U.S. PATENT DOCUMENTS

| | | | |
|---|---|---|---|
| 4,153,273 | 5/1979 | Risko | 280/740 |
| 4,191,392 | 3/1980 | Barnett | 280/740 |
| 5,062,664 | 11/1991 | Bishop et al. | 280/743 |
| 5,172,933 | 12/1992 | Strasser | 280/740 |
| 5,209,519 | 5/1993 | Shiga et al. | 280/728 |
| 5,284,358 | 2/1994 | Rhein | 280/728 A |

FOREIGN PATENT DOCUMENTS

| | | | |
|---|---|---|---|
| 5065048 | 3/1993 | Japan | 280/728 A |
| 9013457 | 11/1990 | WIPO | 280/728 A |

*Primary Examiner*—Karin L. Tyson
*Assistant Examiner*—Christopher P. Ellis
*Attorney, Agent, or Firm*—George W. Rauchfuss; Gerald K. White

[57] ABSTRACT

A deep drawn reaction canister encloses a hybrid inflator. In order to evenly inflate an airbag, a diffuser sheet is positioned over the inflator to distribute the gases which exit one end of the inflator. The diffuser sheet serves a second function of securing the inflator in the canister. It does so by means of screws which extend through the canister and into threaded engagement with the diffuser sheet, placing it in tension when the screws are tightened.

13 Claims, 2 Drawing Sheets

HYBRID INFLATOR RETENTION IN AUTOMOTIVE AIRBAG MODULE

TECHNICAL FIELD

This invention pertains to the field of automotive airbag installations. More particularly, it relates to passenger side modules employing hybrid inflators and a diffuser which is a separate element from the reaction canister.

BACKGROUND ART

Currently there are three fundamentally different reaction canisters employed in passenger side airbag modules. These are the extruded (usually aluminum) can, the folded sheet metal can, and the deep drawn can. Another element which is widely used in passenger side airbag modules is the hybrid inflator. The hybrid inflator is characterized, in part, by the fact that it generally emits inflating gas from only one end. Because of this, a metal diffuser is required to ensure an even flow of gas from the inflator into the airbag.

In the case of extruded canisters, the diffusers may, although they need not necessarily, be extruded as an integral part of the canister extrusion. In the case of folded sheet metal canisters, diffusers are relatively easily installed. In both instances, suitable provisions are normally made for securely retaining the inflator in the canister to prevent rattles. These results are most easily achieved in the extruded and folded sheet metal canisters wherein the use of separate end plates simplifies the installation of both inflators and diffusers.

In a deep drawn canister, on the other hand, there are no separate end plates. As a result, hybrid inflators have not been employed in combination with such canisters. Obviously, however, it would be desirable to reduce the number of parts and the assembly time which results from the use of extruded and folded sheet metal canisters.

Accordingly, it is a primary object of the present invention to provide a passenger side airbag module assembly which includes both a deep drawn canister and a hybrid inflator. Another object is to provide such an assembly wherein a single element performs the dual functions of serving as a gas diffuser and a canister retainer. Other objects, features, and advantages will become apparent from the following description and appended claims.

DISCLOSURE OF INVENTION

The invention comprises a trough-shaped reaction canister within which is housed a hybrid inflator. A diffuser sheet is formed from a rectangular metallic plate. One of the longer edges of the rectangle is secured internally to one of the canister sidewalls. The diffuser sheet is stretched tightly over the body of the inflator and its opposite edge is drawn into engagement with the reaction canister to tightly secure and hold the inflator in position. The diffuser sheet includes gas diffusing openings along its length to permit gas from the inflator to flow evenly into the airbag.

BEST MODE FOR CARRYING OUT THE INVENTION

Figure 1:
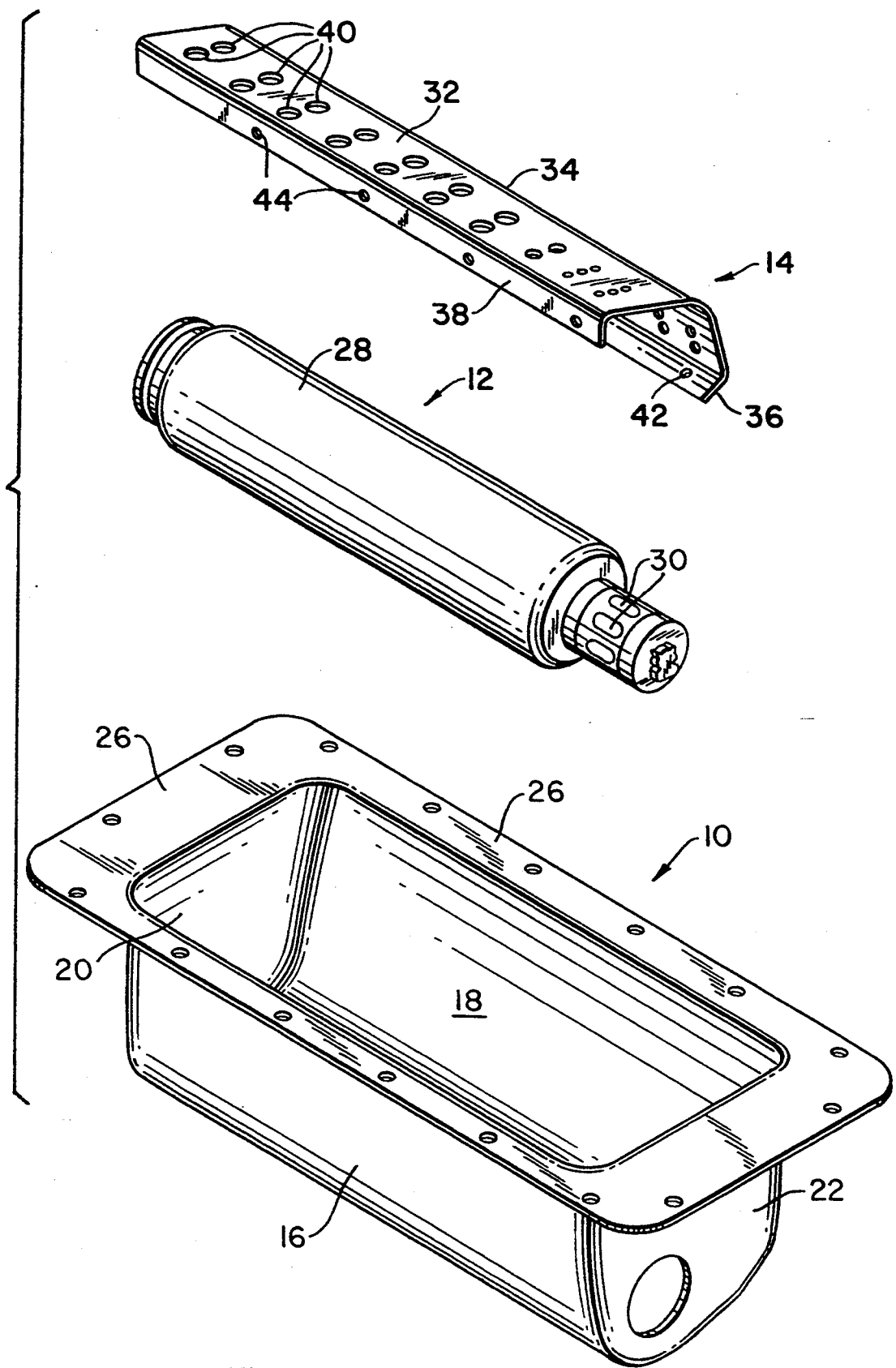
FIG. 1 is an exploded isometric view of the three major elements of the invention.

Referring to the drawings, FIG. 1 illustrates the three basic components of the invention, namely: the reaction canister 10; a conventional hybrid inflator 12; and a metal diffuser 14. The reaction canister 10 is formed by the deep drawing process. Consequently, it is in one piece. It is generally trough-shaped including first 16 and second. 18 sidewalls, first 20 and second 22 endwalls, and a curved floor 24. The open mouth of the reaction canister 10 is surrounded by a mounting flange 26.

Figure 2:
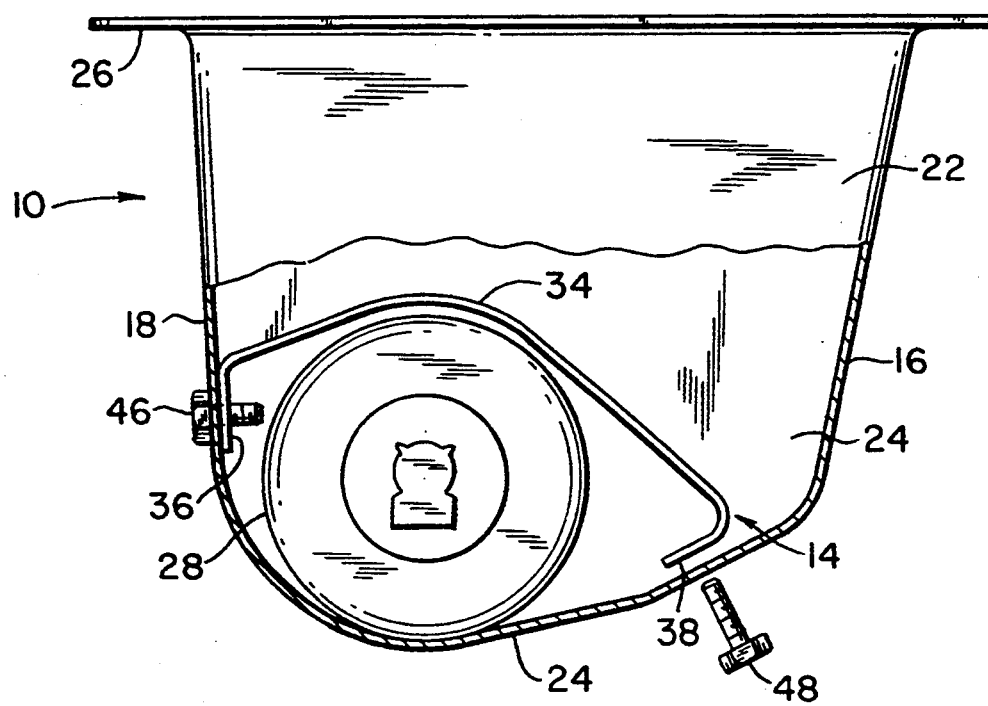
FIG. 2 is an end view of the partially assembled elements with a portion of the canister broken away to better illustrate the manner of assembly.
Figure 3:
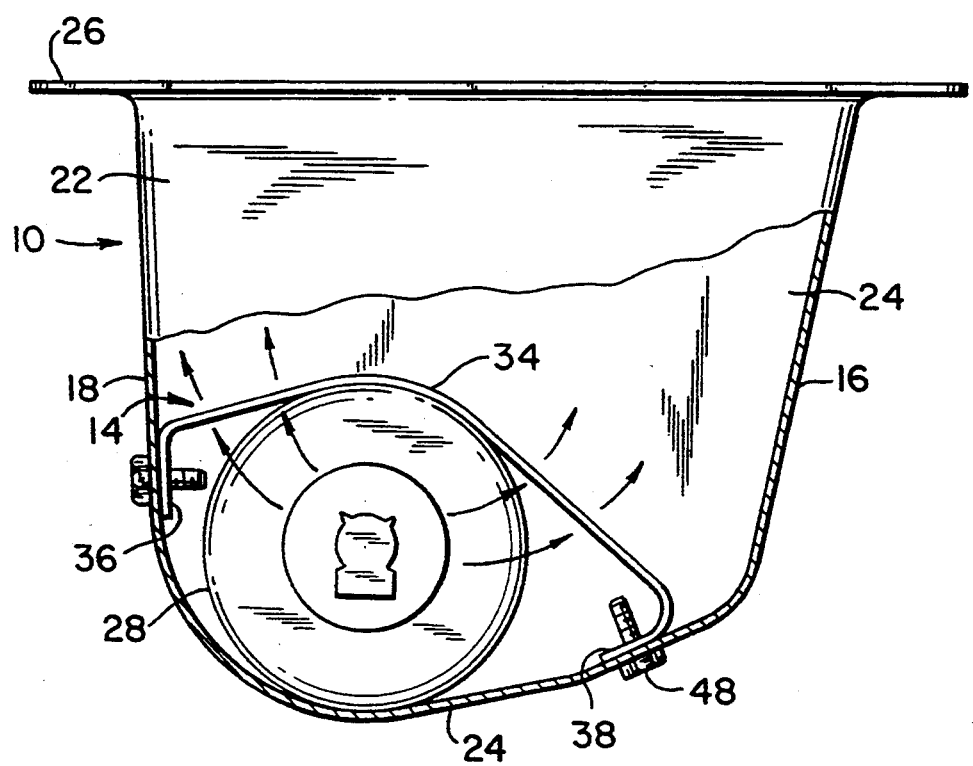
FIG. 3 is a view similar to FIG. 2 illustrating the elements fully assembled.

As previously stated, the hybrid inflator 12 is conventional and includes a cylindrical body 28 having gas emission ports 30 at only one end. The length of the reaction canister 10 is such as to receive the inflator 12 therein with its cylindrical body lying on the curved floor 24 as illustrated in FIGS. 2 and 3.

The function of the diffuser 14 is to distribute the gas emitted from the ports 30 of the inflator 12 along the length of the reaction canister so as to evenly fill the airbag (not shown). The folded airbag is housed at least partially within the canister with its open mouth positioned to receive the gases from the diffuser 14. As the airbag does not form a part of this invention, it is not illustrated and need not be further described.

The diffuser 14 is a sheet metal plate 32 which extends the length of the canister 10 from one end wall 20 to the other end wall 22. The plate 32 is essentially rectangular but is formed with a longitudinal bend 34 which is adapted to overlie the cylindrical body 28 of the inflator 12. The longitudinal edges of the rectangular plate 32 are bent to provide a first 36 and a second 38 mounting edge. The plate 32 defines gas diffusing openings 40 along its length. These openings lie on either side of the bend 34 in order to provide a clear passage for gas flowing from the gas ports 30 in the inflator 12. As the bend 34 portion of the plate 32 will lie flush against the cylindrical body 28, openings are not required in that portion. Although not precluded, they would be blocked to gas flow and, thus, ineffectual.

In addition to the distribution of inflating gas, the diffuser 14 serves an important second function. It clamps the inflator 12 securely against the floor 24 of the reaction canister 10 in the following fashion. The first mounting edge 36 of the diffuser 14 is provided with mounting holes 42 therealong. Similar holes 44 are provided along the length of the second mounting edge 38. Corresponding holes are provided in the second sidewall 18 and a portion of the floor 24 of the reaction canister 10. The diffuser 14 is positioned within the reaction canister 10 and over the cylindrical body 28 of the inflator 12 and its first mounting edge 36 is secured to the second sidewall 18 of the reaction canister by means of screws 46.

The size of the diffuser 14 is such that its second mounting edge 38 barely reaches that portion of the floor 24 containing its matching mounting holes. Screws 48 are extended through these holes and into threaded engagement with the mounting holes 44 of the second mounting edge 38 as illustrated in FIG. 2. The screws (which may be sheet metal screws) are then tightened so as to pull the diffuser 14 downward and into tight engagement with the cylindrical body 28 of the inflator 12 as illustrated in FIG. 3. In this fashion, the inflator 12 is held firmly in position to prevent rattling while simultaneously permitting the distribution of gas flow into the reaction canister 10 as illustrated by the arrows in FIG. 3.

It is believed that the many advantages of this invention will now be apparent to those skilled in the art. It will also be apparent that a number of modifications may be made therein without departing from its spirit and scope. Accordingly, the foregoing description is to be construed as illustrative only, rather than limiting. This invention is limited only by the scope of the following claims.

We claim:

1. A reaction canister assembly for use in a vehicle airbag module which comprises:
   a reaction canister in the form of a trough having a floor and spaced first and second sidewalls and first and second endwalls defining an open mouth;
   a substantially cylindrical inflator positioned within said canister below said open mouth and against said floor, said inflator having gas emission ports located substantially solely at one end thereof;
   a substantially rectangular diffuser sheet having first and second mounting edges extending substantially the length of said trough, first and second ends substantially abutting the respective first and second endwalls of said canister, said sheet further including gas diffusing openings therethrough;
   means for securing the first mounting edge of said diffuser sheet to the first sidewall; and
   means for bringing the second mounting edge of said diffuser sheet into engagement with a portion of the reaction canister on the opposite side of said inflator while simultaneously tensioning said sheet to grip said inflator while leaving the gas diffusing openings free of blockage by the inflator.

2. The assembly of claim 1 wherein said second edge bringing means comprises screws extending through said reaction canister in threaded engagement with said second edge.

3. The assembly of claim 1 wherein said reaction canister is deep drawn.

4. The assembly of claim 1 wherein the portion of the reaction canister engaging the second end of the diffuser sheet is the floor.

5. The assembly of claim 2 wherein said reaction canister is deep drawn.

6. The assembly of claim 2 wherein the portion of the reaction canister engaging the second end of the diffuser sheet is the floor.

7. The assembly of claim 5 wherein the portion of the reaction canister engaging the second end of the diffuser sheet is the floor.

8. The assembly of claim 1 wherein said inflator is a hybrid inflator.

9. The assembly of claim 7 wherein said inflator is a hybrid inflator.

10. The assembly of claim 1 wherein said diffuser sheet defines a bend running substantially along its length for engagement with said inflator, said gas diffusing openings being positioned on either side of said bend.

11. The assembly of claim 9 wherein said diffuser sheet defines a bend running substantially along its length for engagement with said inflator, said gas diffusing openings being positioned on either side of said bend.

12. A diffuser for use in securing a substantially cylindrical inflator within the reaction canister assembly of a vehicle airbag module which comprises:
    a substantially rectangular metal sheet dimensioned to fit within said reaction canister, said sheet including first and second mounting edges and first and second ends;
    a longitudinal bend extending along the length of said sheet from said first end to said second end adapted to overlie said cylindrical inflator;
    said sheet defining gas diffusing openings therethrough positioned on either side of said bend;
    means for securing said first and second mounting edges to the interior of said reaction canister; and
    means for bringing one of the mounting edges of said diffuser sheet into engagement with a portion of the reaction canister to simultaneously tension said sheet to grip said inflator while leaving the gas diffusing openings free of blockage by the inflator.

13. The diffuser of claim 12 wherein said securing means comprises mounting holes extending along said first and second mounting edges.

* * * * *

UNITED STATES PATENT AND TRADEMARK OFFICE
CERTIFICATE OF CORRECTION

PATENT NO. : 5,405,164
DATED      : 11 April 1995
INVENTOR(S) : Donald J. Paxton et al.

It is certified that error appears in the above-indentified patent and that said Letters Patent is hereby corrected as shown below:

At column 2, line 15, "and second.  18 sidewalls," should be

--and second 18 sidewalls,--.

Signed and Sealed this

Fourth Day of June, 1996

Attest:

BRUCE LEHMAN

*Attesting Officer*    Commissioner of Patents and Trademarks